US007139038B2

(12) United States Patent
Dumont et al.

(10) Patent No.: US 7,139,038 B2

(45) Date of Patent: Nov. 21, 2006

(54) VIDEO APPARATUS USING SEVERAL VIDEO SIGNAL SOURCES AND PROCESS FOR CONTROLLING SUCH A VIDEO APPARATUS

(75) Inventors: Frank Dumont, Singapore (SG); Chee Lam Tan, Singapore (SG); Qing Jin Zhou, Singapore (SG)

(73) Assignee: Thomson Licensing, Boulogne-Billancourt (FR)

( * ) Notice: Subject to any disclaimer, the term of this patent is extended or adjusted under 35 U.S.C. 154(b) by 462 days.

(21) Appl. No.: 10/363,071

(22) PCT Filed: Aug. 27, 2001

(86) PCT No.: PCT/EP01/09854

§ 371 (c)(1), (2), (4) Date: Feb. 28, 2003

(87) PCT Pub. No.: WO02/21830

PCT Pub. Date: Mar. 14, 2002

(65) Prior Publication Data

US 2003/0174224 A1 Sep. 18, 2003

(30) Foreign Application Priority Data

Sep. 8, 2000 (EP) ................................. 00402485

(51) Int. Cl.
*H04N 5/268* (2006.01)

(52) U.S. Cl. ...................................... 348/706; 348/554

(58) Field of Classification Search ................ 348/705, 348/569, 722, 706, 554, 555; *H04N 5/268*
See application file for complete search history.

(56) References Cited

U.S. PATENT DOCUMENTS

| | | | | |
|---|---|---|---|---|
| 4,677,488 | A * | 6/1987 | Zato | 348/706 |
| 5,034,818 | A * | 7/1991 | Baik-Hee | 348/706 |
| 5,475,443 | A | 12/1995 | Kwon | 348/569 |
| 5,493,340 | A | 2/1996 | Kim | 348/569 |
| 5,721,593 | A * | 2/1998 | Suh | 348/564 |
| 5,724,104 | A | 3/1998 | Eom | 348/569 |
| 6,091,459 | A | 7/2000 | Masaike | 348/569 |

FOREIGN PATENT DOCUMENTS

EP 1187466 A1 * 3/2002

* cited by examiner

*Primary Examiner*—Michael H. Lee
(74) *Attorney, Agent, or Firm*—Joseph J. Laks; Robert D. Shedd

(57) ABSTRACT

A video apparatus has a first connector for outputting first RGB signals, a second connector for receiving second RGB signals, and an On-Screen Display circuit generating third RGB signals. A RGB generator generates fourth RGB signals. A first RGB switch is connected to the second connector and to the On-Screen Display circuit for receiving respectively said second RGB signals and said third RGB signals. The first RGB switch outputs fifth RGB signals. A second RGB switch is connected to the first RGB switch and to the RGB generator for receiving respectively said fifth RGB signals and said fourth RGB signals. The second RGB switch outputs the first RGB signals. A process to control such a video apparatus is also proposed.

6 Claims, 3 Drawing Sheets

VIDEO APPARATUS USING SEVERAL VIDEO SIGNAL SOURCES AND PROCESS FOR CONTROLLING SUCH A VIDEO APPARATUS

This application claims the benefit, under 35 U.S.C. § 365 of International Application PCT/EP01/09854, filed Aug. 27, 2001, which was published in accordance with PCT Article 21(2) on Mar. 14, 2002 in English and which claims the benefit of European patent application No. 00402485.7 filed Sep. 8, 2000.

The invention relates to a video apparatus using several video signal sources and to a process for controlling such a video apparatus.

A video apparatus generally has a connector to output video signals to another video apparatus, for instance a display. Such a connector can carry a video signal represented by three monochrome signals, namely a red signal R, a green signal G and a blue signal B. For instance, on conventional Scart connectors, pins 15, 11 and 7 are used for this purpose.

So far, the RGB signals coming out on this connector where generated by an On-Screen Display circuit under control of a micro-processor. It has also been proposed to transmit on this connector RGB signals received on another connector of the video apparatus, for instance an input Scart connector, generally called Scart2. The signal received on Scart2 were for instance signals from a set-top box.

The invention seeks to take advantage of another source of video signal in RGB format and still to be able to transmit it through a conventional connector.

The invention proposes a video apparatus with a first connector for outputting first RGB signals, with a second connector for receiving second RGB signals, and with an On-Screen Display circuit generating third RGB signals, wherein a RGB generator generates fourth RGB signals, wherein a first RGB switch is connected to the second connector and to the On-Screen Display circuit for receiving respectively said second RGB signals and said third RGB signals, wherein the first RGB switch outputs fifth RGB signals, wherein a second RGB switch is connected to the first RGB switch and to the RGB generator for receiving respectively said fifth RGB signals and said fourth RGB signals, and wherein the second RGB switch outputs the first RGB signals.

Some of the preferred features of the invention are the following:

- the first RGB switch is controlled by a first fast-blanking signal generated by the On-Screen Display circuit;
- a first OR-gate generates a second fast-blanking signal based on said first fast-blanking signal and on a fast-blanking signal of the second connector;
- said second fast-blanking signal controls the second RGB switch;
- a second OR-gate generates a third fast-blanking signal based on said second fast-blanking signal and on a fast-blanking signal of the RGB generator;
- said third fast-blanking signal is output on a pin of the first connector;
- said third fast-blanking signal is output on a pin of the first connector through an amplifier;
- a source switch allows to connect a composite video signal pin of the second connector to a digital generator, a digital switch allows to connect the digital generator to a digital decoder generating said fourth RGB signals and a muting circuit is inserted between the second connector and the first RGB switch.

The invention also proposes a process for controlling such a video apparatus comprising the steps of:

- controlling the source switch to connect the composite video signal pin of the second connector to the digital generator;
- controlling the digital switch to connect the digital generator to the digital decoder;
- controlling the muting circuit to mute said second RGB signals.

According to a preferred feature, it includes the subsequent step of controlling the On-Screen Display circuit to output RGB signals indicating said second RGB signals are muted.

The invention and other features thereof will be understood in the light of the following description made with reference to the attached drawings where:

In the following description, reference numbers 1 to 20 are dedicated to the corresponding pins of the Scart connector according to the norm. It should also be noted that the ground wires are not represented for better clarity of the drawings.

Figure 1:
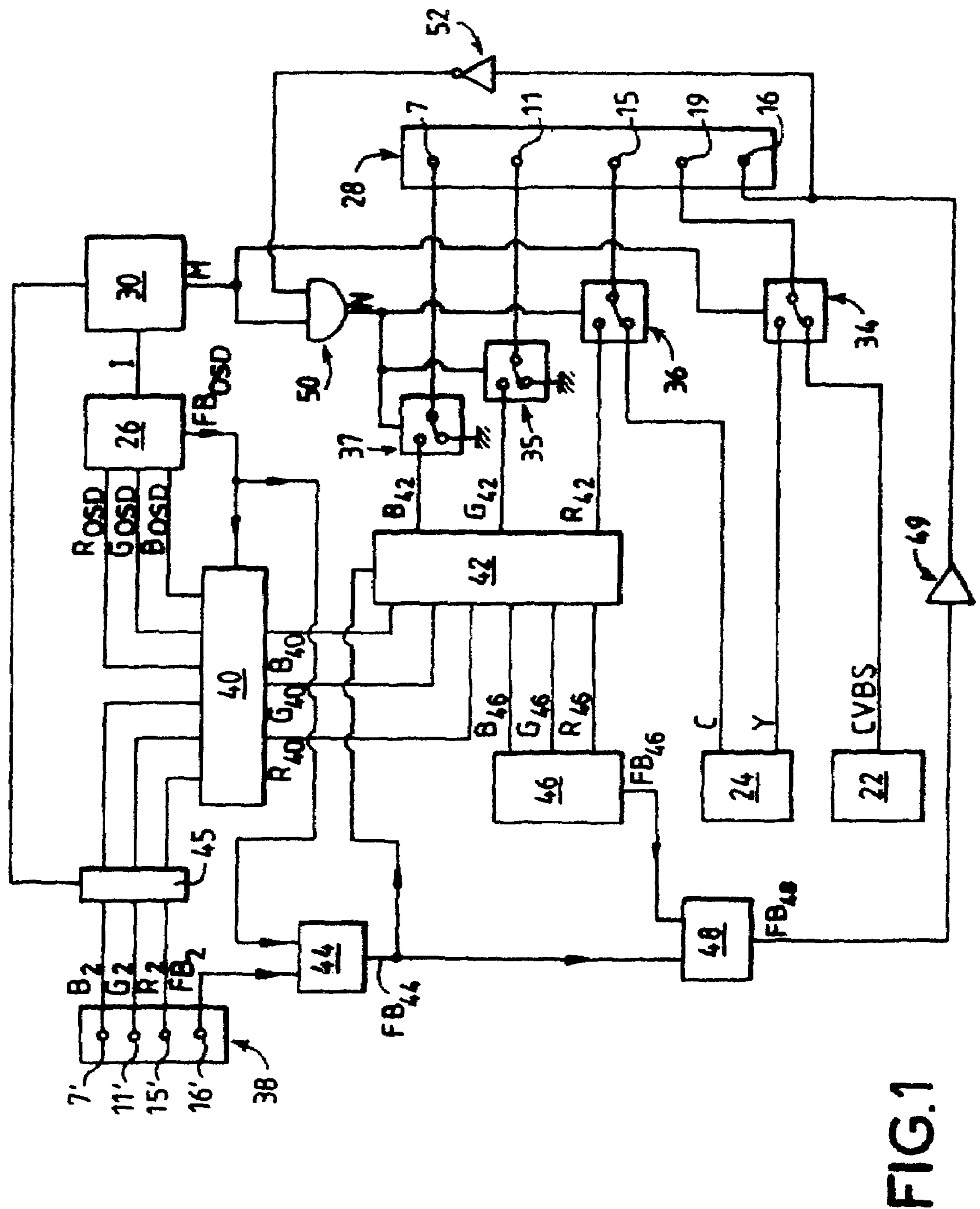
FIG. 1 represents a first embodiment of a video apparatus according to the invention.

The main elements of the video processing circuits of a video recorder are represented on FIG. 1. The video recorder comprises a CVBS generator 22, a S-Video generator 24 and a RGB generator 46.

Such a VCR can read video tapes recorded according to the VHS standard and thus generate a CVBS signal on the output of the CVBS generator 22 in a conventional way. The CVBS generator 22 represents the set of parts which are used to generate the CVBS signal from the signal recorded on the tape.

In a similar way, the VCR can read video tapes recorded according to the S-VHS standard thanks to the S-Video generator 24 which outputs separate luminance Y and chrominance C signals.

Lastly, the VCR can read video tapes recorded according to the D-VHS standard and outputs notably corresponding RGB signals on outputs $R_{46}$, $G_{46}$ and $B_{46}$ in accordance with a fast blanking signal $FB_{46}$. In the described embodiment, the RGB generator 46 is a MPEG decoder STI5500 from ST fed by a bit-stream processor SAA6700H from Philips according to data read on a tape in a digital format. Of course, another medium could be used: for instance, the video signal represented by $R_{46}$, $G_{46}$, $B_{46}$ could be taken from a video disc or a hard disc.

The VCR also includes an On-Screen Display (OSD) circuit 26 for the purpose of displaying menus on a display (for instance a TV set) to which the VCR can be linked via a Scart connector 28.

The OSD circuit 26 generates three separate monochrome signals (respectively red signal $R_{OSD}$, green signal $G_{OSD}$ and blue signal $B_{OSD}$) according to the RGB format and a fast blanking signal $FB_{OSD}$ indicating to the display when these RGB signals should be taken into account (high level of $FB_{OSD}$).

The OSD circuit 26 receives instructions from a microprocessor 30 via a data bus I represented as a single wire on FIG. 1 for simplification.

The VCR includes a further Scart connector 38, called Scart2, which pins will be referenced as 1' to 20'. This Scart2 connector 38 allows to connect an external video device to the VCR, for instance a digital set-top box which is able to receive video information from satellites or a cable link. Video sequences are allowed to enter the VCR on pins 7', 11' and 15' of Scart2 connector 38 in a RGB format as a picture to be superimposed on the sequences carried on composite signal pin 19' or generated by the VCR, according to an OSD technique.

The RGB signal received on the pins of the Scart2 connector 38 (composed as usual of three separate monochrome signals $R_2$, $G_2$ and $B_2$) is forwarded to a first RGB switch 40 on three respective inputs. Three other inputs of the first RGB switch 40 receive respectively the three monochrome signals $R_{OSD}$, $G_{OSD}$ and $B_{OSD}$ from the OSD circuit 26.

The Scart2 connector 38 also outputs a fast blanking signal $FB_2$ on its pin 16' in accordance with the RGB signal from pins 7', 11' and 15'.

The first RGB switch 40 also receives the fast blanking signal $FB_{OSD}$ from the OSD circuit 26. When $FB_{OSD}$ is high, the first RGB switch 40 transmits on its three RGB outputs $R_{40}$, $G_{40}$, $B_{40}$ respectively the $R_{OSD}$, $G_{OSD}$ and $B_{OSD}$ signals; at the opposite, when $FB_{OSD}$ is low, the first RGB switch 40 transmits on its three RGB outputs $R_{40}$, $G_{40}$, $B_{40}$ respectively the $R_2$, $G_2$ and $B_2$ signals. The RGB signal output from the first RGB switch 40 is thus the image from Scart2 connector 38 with superimposed parts of image generated by the OSD circuit 26.

It can be noted that a muting circuit 45 is interposed between the Scart2 connector 38 and the first RGB switch 40. The muting circuit 45 is controlled by the micro-processor 30 in order to mute the RGB signals from the Scart2 connector 38 when they are not synchronised with the signal output on pin 19 of the Scart connector 28.

A first OR-gate 44 combines the fast blanking signal $FB_2$ from the Scart2 connector 38 and the fast blanking signal $FB_{osd}$ from the OSD circuit 26. The output $FB_{44}$ of the OR-gate 44 is thus at a high level when either the fast blanking signal $FB_2$ from the Scart2 connector 38 is or the fast blanking signal $FB_{OSD}$ from the OSD circuit 26 is at a high level. At the opposite, when both $FB_2$ and $FB_{OSD}$ are at a low level, $FB_{44}$ is at a low level. Said differently, $FB_{44}$ represents the fast blanking signal for the image from the Scart2 connector 38 (represented by $R_2$, $G_2$ and $B_2$) with superimposed image from the OSD circuit 26 (represented by $R_{OSD}$, $G_{OSD}$ and $B_{OSD}$).

A second RGB switch 42 receives on the one hand the signals $R_{40}$, $G_{40}$, $B_{40}$ from the first RGB switch 40 and on the other hand the signals $R_{46}$, $G_{46}$, $B_{46}$ from the RGB generator 46. The second RGB switch 42 is controlled by the output of the first OR-gate, i.e. the fast blanking signal $FB_{44}$. The second RGB switch 42 outputs a RGB signal on pins $R_{42}$, $G_{42}$ and $B_{42}$ which is selectively the signal from the first RGB switch 40 or the signal from the RGB generator 46 depending on the fast blanking signal $FB_{44}$.

More precisely, the second RGB switch 42 outputs the RGB signal received from the first RGB switch 40 when the fast blanking signal $FB_{44}$ is at a high level and the RGB signal received from the RGB generator 46 when the fast blanking signal $FB_{44}$ is at a low level. The video signal represented by $R_{42}$, $G_{42}$ and $B_{42}$ at the output of the second RGB switch 42 is thus the image from the RGB generator 46 on which is superimposed the image for the first RGB switch 40, i.e. the image from the Scart2 connector 38 with superimposed OSD (from OSD circuit 26).

A second OR gate 48 receives the fast blanking signal $FB_{44}$ from the first OR gate 44 and the fast blanking signal $FB_{46}$ from the RGB generator 46. In a way similar to the first OR gate 44, the second OR gate 48 realises a logical OR operation between these two signals and generates on its output $FB_{48}$ a fast blanking signal corresponding to the video signal generated on the output of the second RGB switch 42. This fast blanking signal $FB_{48}$ is then passed via a 10 dB amplifier 49 to pin 16 of the Scart connector 28 to be used as a fast-blanking signal in the apparatus, for instance display, connected to the Scart connector 28.

The amplifier 49 allows to output on pin 16 a sufficient voltage to be used by the apparatus connected to the Scart connector 28 (e.g. display) in spite of the possible voltage reductions in OR-gates 44 and 48 and of possible uneveness between the various initial blanking signals $FB_2$, $FB_{OSD}$ and $FB_{46}$.

A luminance switch 34 receives a composite video signal CVBS from the CVBS generator 22 and a luminance signal Y from the S-Video generator 24. The luminance switch 34 is controlled by a control signal M from the micro-processor 30 to selectively output to pin 19 of the Scart connector 28 the composite video signal CVBS or the luminance signal Y.

A chrominance switch 36 receives a chrominance signal C from the S-Video generator 24 and the red signal $R_{42}$ from the second RGB switch 42. The chrominance switch 36 is controlled by a command N to selectively output to pin 15 of the Scart connector 28 the red signal $R_{42}$ or the chrominance signal C. Command N is generated at the output of a AND-gate 50 which first input receives the control signal M and which second input receives the inverted fast-blanking signal of pin 16 (i.e. the fast-blanking signal FB passed through an inverter 52).

A first ground switch 35 allows to selectively connect pin 11 of the Scart connector 28 to the green signal $G_{42}$ from the second RGB switch 42 or to ground. Similarly, a second ground switch 37 allows to selectively connect pin 7 of the Scart connector 28 to the blue signal $B_{42}$ from the second RGB switch 42 or to ground. Both the first ground switch 35 and the second ground switch 37 are controlled by the signal N controlling the chrominance switch 36.

The VCR can work according to two possible modes, namely a first mode where the Scart connector 28 carries a CVBS signal and a second mode where the Scart connector 28 is allowed to carry a S-Video signal ("S-Video via Scart mode"). The working mode can be selected through menus generated by the micro-processor 30 and the OSD circuit 26 and stored in a memory accessible by the micro-processor 30. The two working modes will be described now with further details.

In the first mode, the micro-processor 30 sets the control signal M to low level (0) whereby the luminance switch 34 connects the output of the CVBS generator 22 to pin 19 of the Scart connector 28.

As the control signal M is low, the output (signal N) of the AND-gate 50 is also low, whereby the chrominance switch 36 connects the red signal output $R_{42}$ of the second RGB switch 42 with pin 15 of the Scart connector 28 and whereby the ground switches 35, 37 connect respectively the green signal output $G_{42}$ and the blue signal output $B_{42}$ of the second RGB switch 42 with pins 11 and 7 of the Scart connector 28.

In the second mode, it is possible to use the Scart connector 28 for S-Video: this mode is thus called "S-Video via Scart" and can be chosen by the user through menus.

If no S-Video signal is available at the output of the S-Video generator 24, for instance when the tape read by the VCR is a VHS tape, the control signal M remains at low level (0) and the connections realised by the switches are thus identical to those described in the first mode.

When the user has selected the "S-Video via Scart" mode and when the S-Video generator 24 is active, the micro-processor 30 sets the control signal M to 1 (high level).

Under these conditions, if nothing from the second RGB switch 42 is to be superimposed on the S-Video signal, the fast blanking signal $FB_{48}$ from the second OR-gate is low; the signal from inverter 52 will then be high and hence the output of the AND-gate 50 will also be high: accordingly, the chrominance switch 36 will connect pin 15 to the chrominance output C of the S-Video generator and the ground switches 35, 37 will connect pins 7 and 11 to ground (in order to avoid cross-talk). Of course, as the control signal M is high, the luminance switch 34 connects pin 19 to the luminance output Y of the S-Video generator 24.

Still under the same conditions (high control signal M), the second RGB switch 42 can output a RGB signal to be superimposed (or inserted) on the video signal from the S-Video generator 24. During the insertion, the fast blanking signal $FB_{48}$ is high; the output of the inverter 52 is consequently low which sets the output of the AND-gate 50 to low level: the chrominance switch 36 and the ground switches 35, 37 then connect the R, G, B outputs respectively to pins 15, 11 and 7. It is to be noted that, in the present embodiment, the control of the luminance switch 34 remains unchanged during insertion, so that pin 19 of the Scart connector 28 remains connected to the luminance output Y of the S-Video generator 24.

According to a possible variation, the chrominance switch 36 is controlled by control signal M: only the connections in the ground switches 35, 37 are changed when the fast-blanking signal FB is high during the "S-Video via Scart" mode, the chrominance switch 34 maintaining the connection between the chrominance output C and pin 15.

Figure 2:
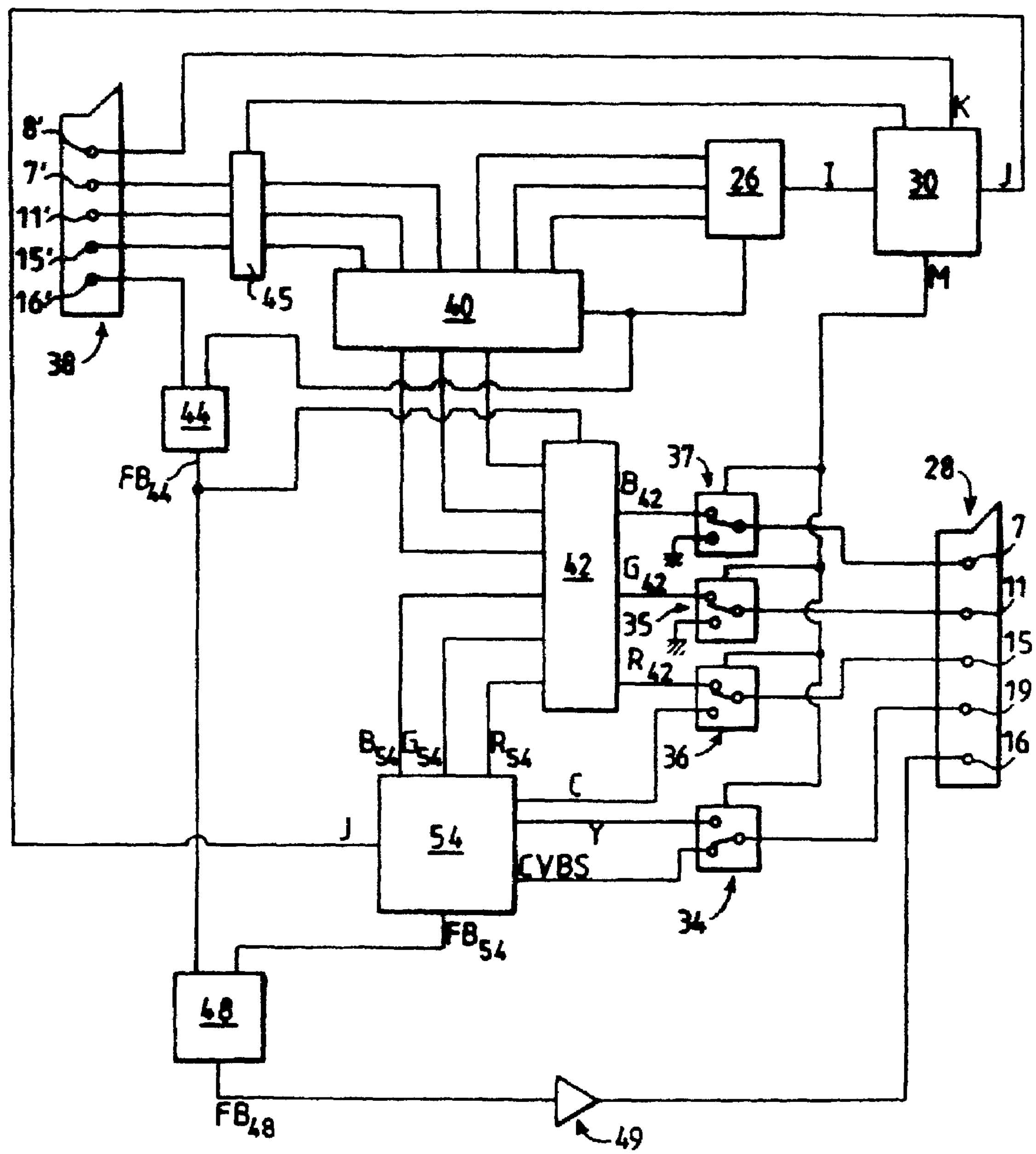
FIG. 2 represents a second embodiment of a video apparatus according to the invention.

A second embodiment of the invention is illustrated on FIG. 2. The parts which are similar to the first embodiment will not be described once again.

The luminance switch 34, the chrominance switch 36 and the ground switches 35, 37 are controlled by a command M from the micro-processor 30. (Countrarily to FIG. 1, the fast blanking signal is not used to control any of said switches.)

A video generator 54 comprises a composite output CVBS, S-Video outputs (namely a luminance output Y and a chrominance output C) and RGB outputs (namely a monochrome red output $R_{54}$, a monochrome green output $G_{54}$, a monochrome blue output $B_{54}$ and a fast blanking signal output $FB_{54}$). The video generator 54 carries on said outputs three representations (composite, S-Video and RGB) of the same video sequence.

The RGB outputs: $R_{54}$, $G_{54}$, $B_{54}$ of the video-generator 54 are connected as inputs to the second RGB switch 42. The RGB outputs of the first RGB switch 40 are also input to the second RGB switch, as described in relation with the first embodiment.

The video generator 54 carries on its output $FB_{54}$ a fast-blanking signal synchronised with the RGB signals $R_{54}$, $G_{54}$, $B_{54}$ and which is input to the second OR-gate 48. The RGB signals can be muted by the video generator 54; the fast-blanking signal is then $FB_{54}$ at low level.

The micro-processor 30 is linked with the OSD circuit 26 by a bus I and to the video generator 54 by a bus J. The micro-processor 30 is also connected to pin 8' of the Scart2 connector 38 via a connection K. Pin 8' is generally called "Slow switch" and carries information whether a video signal is incoming from the Scart2 connector 38 with a time constant largely longer than fast blanking signals.

As previously described, when a S-Video signal is available on outputs Y, C of the video generator 54 and when the "S-Video via Scart" mode is selected by the user, the luminance switch 34 connects output Y to pin 19 of the Scart connector 28, the chrominance switch 36 connects output C to pin 15, the first ground switch 35 connects pin 11 to ground and the second ground switch 37 connects pin 7 to ground. The RGB signals $R_{54}$, $G_{54}$, $B_{54}$ from the video generator 54 are muted.

The video apparatus can then operate according to two alternative processes when OSD insertion is required. The process to be used is selected according to a prior choice made by the user (for instance through "User Preferences" menus) and recorded in a memory accessible to the micro-computer 30. It should be noted however that one only of the two processes could be implemented in a given video apparatus.

According to a first process, when a RGB video signal from the Scart2 connector 38 is detected by the micro-processor 30 (thanks to connection K as explained above) or when the micro-processor 30 has to send instructions for OSD insertion to the OSD circuit 26 on bus I, the luminance switch 34 connects back the CVBS output of the video generator 54 to pin 19 of the Scart connector 28, the chrominance switch 36 connects back the red output R of the second RGB switch 42 to pin 15, the first ground switch 35 connects back the green ouput G of the second RGB switch 42 to pin 11 and the second ground switch connects back the blue output B of the second RGB switch 42 to pin 7. Of course, the switches are controlled by the micro-processor 30 through control line M. The RGB signals $R_{54}$, $G_{54}$, $B_{54}$ from the video generator 54 remain muted.

According to the first process, the CVBS signal is thus used instead of the S-Video signal during OSD insertion (either from Scart2 or from the OSD circuit); this leads to a loss in image quality but to a very secure OSD insertion as the Scart switch is used in a totally conventional manner.

It is important to point out that this process can be used in a video apparatus where the video generator 54 does not generate RGB signals, as for instance some S-VHS VCRs.

According to the second process, when a RGB video signal from the Scart2 connector 38 is detected by the micro-processor 30 (thanks to connection K as explained above) or when the micro-processor 30 has to send instructions for OSD insertion to the OSD circuit 26 on bus I, the micro-processor 30 controls through line M the chrominance switch 36, the first ground switch 35 and the second ground switch 37 respectively to connect the red output R, the green ouput G and the blue output B of the second RGB switch 42 back to pins 15, 11 and 7 of the Scart connector 28; simultaneously, the micro-processor 30 controls the video generator 54 to unmute the video signal on the RGB outputs, that is to send out signals on outputs $R_{54}$, $G_{54}$, $B_{54}$ and $FB_{54}$.

The video sequence represented by $R_{54}$, $G_{54}$, $B_{54}$ is then mixed by the second RGB switch with the insertion to be realised (coming from the first RGB switch 40 and comprising the video sequence from Scart2 with superimposed video sequence from the OSD circuit 26). The mixing is realised as described in relation to the RGB generator 46 of the second embodiment. Due to the connection of the switches indicated above, the second RGB switch 42 sends out the desired video sequence (with insertion) to pins 15, 11 and 7 of the Scart connector 28 in synchronism with the fast-blanking signal $FB_{48}$ output from the second OR-gate 48.

For this second process, the connection realised by the luminance switch 34 need not be taken into consideration as neither the luminance signal Y nor the composite signal CVBS are used. However, in order to simplify the circuitry, only one control line M is used and the luminance switch 34 will connect the composite signal output CVBS to pin 19 of the Scart connector 28.

To sum up, according to the second process, the video generator 54 is used as third source of RGB signal in addition to the OSD circuit 26 (first source) and the Scart2 connector 38 (second source). The rules for priority of superimposition (first source on top, then second source, lastly third source) are determined by the connection of the first and second RGB switches 40, 42 as explained in the first embodiment.

Figure 3:
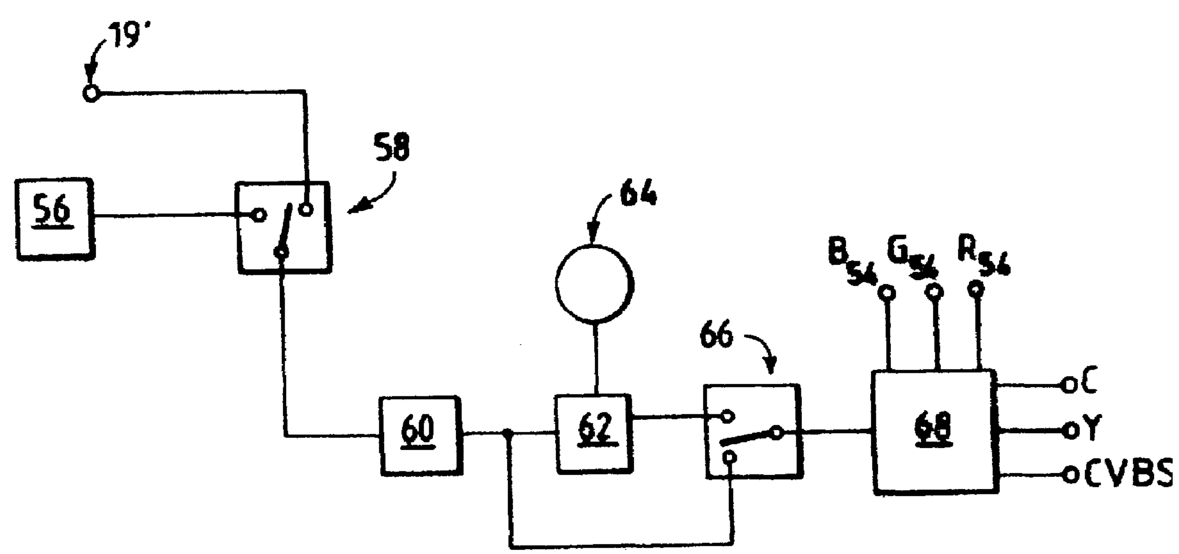
FIG. 3 represents a preferred embodiment of the video generator of FIG. 2.

A preferred embodiment of the video generator 54 is represented at FIG. 3.

In this embodiment, three possible sources of video signal are provided for the video generator 54, namely a composite video signal from pin 19' of the Scart2 connector 38, a composite video signal generated by a conventional tuner and demodulator front-end 56 and a MPEG2 signal generated as a bit stream by a drum set 64 with magnetic heads reading on a tape recorded according to the D-VHS format.

A source switch 58 controlled by the micro-processor 30 depending on instructions from the user allows to selectively connect pin 19' or the front-end 56 to the input of a digital generator 60, for instance realised by a Philips SAA7114 video decoder followed by a NEC uPD61050 MPEG2 encoder. A digital generator is a circuit generating digital streams based on analog signals, as for instance a MPEG2 encoder associate with a video decoder.

A Philips SAA6700H bit-stream processor 62 can receive the MPEG2 stream generated by the digital generator 60 and convert it into a bit stream to be recorded on a magnetic tape by the drum set 64. The bit-stream processor 62 can also convert a bit stream read on a magnetic tape into a MPEG2 stream which is then output to a first input of a digital switch 66.

A second input of the digital switch 66 receives the MPEG2 stream generated by the digital generator 60 mentioned above. The digital switch 66 allows to selectively output the MPEG2 stream generated by the bit stream processor 62 or the MPEG2 stream generated by the digital generator 60 to a digital decoder 68, for instance a SGS—Thomson STI5500 MPEG2 decoder. This IC includes a video encoder realising the composite video signal CVBS, the S-Video signals Y, C and the RGB signals $R_{54}$, $G_{54}$, $B_{54}$ based on the MPEG2 stream output by the digital switch 66.

When a magnetic tape is read by the drum set 64, the micro-processor 30 controls the digital switch 66 to connect the bit stream processor 62 to the DIGITAL decoder 68. The bit stream read from the tape is thus converted into a MPEG2 stream by the bit-stream processor 62 and then output as video signals by the DIGITAL decoder 68 according to the 3 possible formats CVBS, S-Video and RGB.

According to another possible way of operation called "Digital Improvement", the digital switch 66 can connect the output of the digital generator 60 to the input of the digital decoder 68: the composite signal selected by the source switch 58 (i.e. the composite signal from the tuner and demodulator 56, or the composite signal from the Scart2 connector 38) is converted to a MPEG2 stream by the digital generator 60 and then to video signals according to CVBS, S-Video and RGB formats by the digital decoder 68.

This allows to generate S-Video- and RGB-format signals thanks to existing circuits of the machine, thus without the need for specific circuits for this purpose. Moreover, as the initial composite signal is passed through the filters inherently included in the digital generator 60 to realise notably the analog-to-digital conversion, the quality of the images is enhanced.

When the "Digital Improvement" is applied to the composite signal coming from the Scart2 connector 38, that is when the source switch connects pin 19' with the DIGITAL generator 60 and when the digital switch 66 connects the DIGITAL generator 60 with the DIGITAL decoder 68, the initial synchronisation of the composite signal on pin 19' with the RGB and fast blanking signals on pins 15', 11', 7' and 16' is lost by the momentary use of MPEG2. The micro-processor 30 then mutes the RGB signals from the Scart2 connector 38 thanks to the muting circuit 45. In this case, the micro-processor 30 sends instructions to the OSD circuit 26 to display a message indicating that the signals coming on pins 7', 11' and 15' are unavailable and that they can be made available by leaving the "Digital Improvement" mode: for instance, the message can read "OSD from Scart2 muted—To resume OSD, please exit Digital Improvement".

According to a possible variation applicable to any embodiment, ground switches 35 and 37 can be omitted, the green output $G_{42}$ and blue output $B_{42}$ of the second RGB switch 42 being directly connected to pins 11 and 7 of the Scart connector 28. This solution could lead to cross-talk problems but it is cheaper.

The invention claimed is:

1. Video apparatus with a first connector for outputting first RGB signals, with a second connector for receiving second RGB signals, and with an On-Screen Display circuit generating third RGB signals, wherein a RGB generator generates fourth RGB signals, a first RGB switch is connected to the second connector and to the On-Screen Display circuit for receiving respectively said second RGB signals and said third RGB signals, the first RGB switch outputs fifth RGB signals, in that a second RGB switch is connected to the first RGB switch and to the RGB generator for receiving respectively said fifth RGB signals and said fourth RGB signals, the second RGB switch outputs the first RGB signals, the first RGB switch is controlled by a first fast-blanking signal generated by the On-Screen Display circuit, a first OR-gate generates a second fast-blanking signal based on said first fast-blanking signal and on a fast-blinking signal of the second connector, and a second OR-gate generates a third fast-blanking signal based on said second fast-blinking signal and on a fast-blanking signal of the RGB generator.

2. Video apparatus according to claim 1, wherein said third fast-blanking signal is output on a pin of the first connector.

3. Video apparatus according to claim 1, wherein said third fast-blanking signal is output on a pin of the first connector through an amplifier.

4. Video apparatus with a first connector for outputting first RGB signals, with a second connector for receiving second RGB signals, and with an On-Screen Display circuit generating third RGB signals, wherein a RGB generator generates fourth RGB signals, a first RGB switch is connected to the second connector and to the On-Screen Display circuit for receiving respectively said second RGB and said third RGB signals, the first RGB switch outputs fifth RGB signals, a second RGB switch is connected to the first RGB switch and to the RGB generator for receiving respectively said fifth RGB signals and said fourth RGB signals, the second RGB switch outputs the first RGB signals, and a source switch allows to connect a composite video signal pin of the second connector to a digital generator, wherein a digital switch allows to connect the digital generator to a digital decoder generating said fourth RGB signals and wherein a muting circuit is inserted between the second connector and the first RGB switch.

5. Process for controlling a video apparatus according to claim 4, comprising the steps of:

controlling the source switch to connect the composite video signal pin of the second connector to the digital generator;

controlling the digital switch to connect the digital generator to the digital decoder;

controlling the muting circuit to mute said second RGB signals.

6. Process according to claim 5, further comprising the subsequent step of controlling the On-Screen Display circuit to output RGB signals indicating said second RGB signals are muted.

* * * * *